Jan. 30, 1934.  B. H. SMITH  1,945,165
ROASTER
Filed May 27, 1933
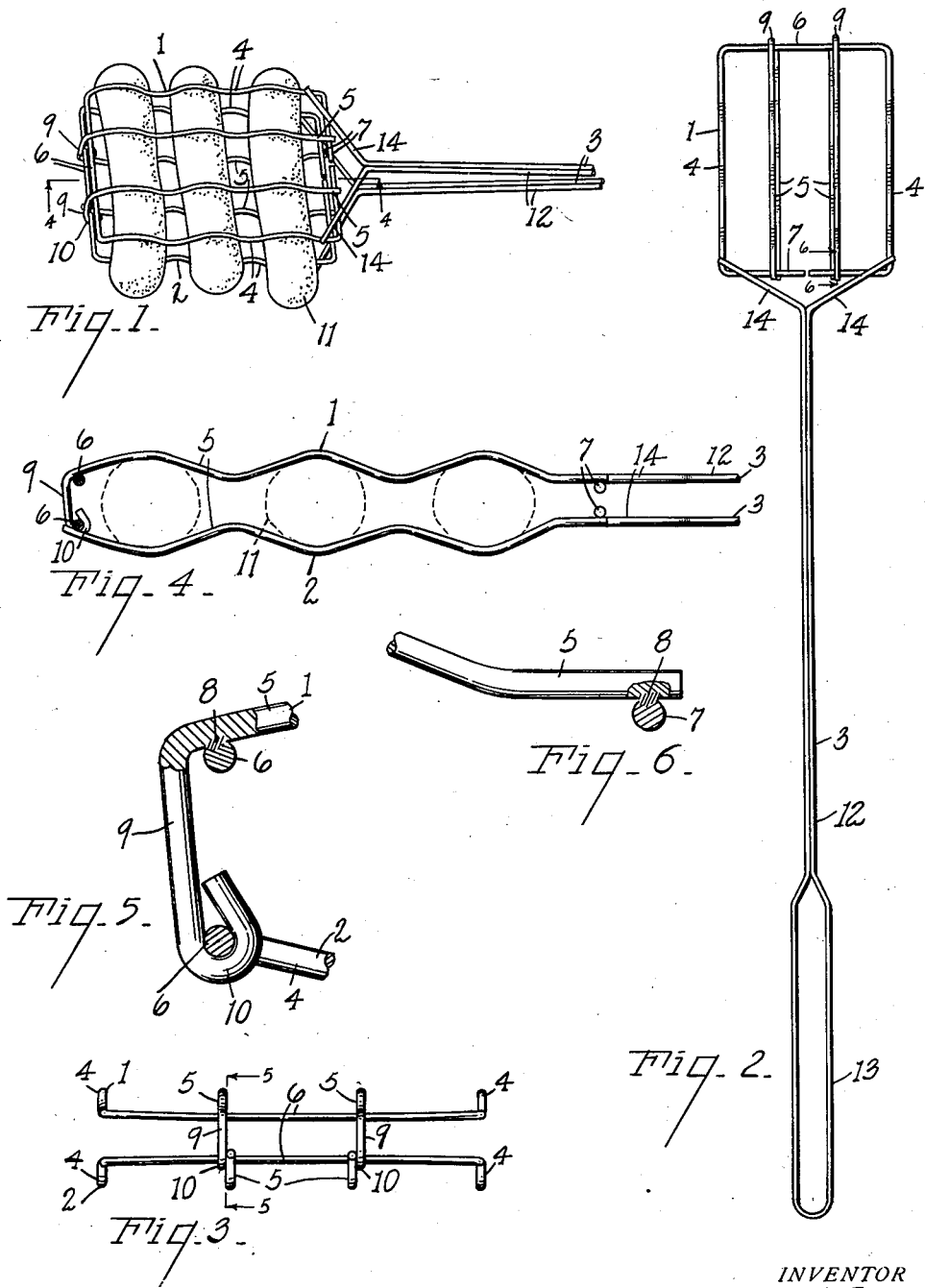
INVENTOR
Benjamin H. Smith
BY
Chappell & Earl
ATTORNEYS Patented Jan. 30, 1934

1,945,165

UNITED STATES PATENT OFFICE 1,945,165

ROASTER

Benjamin H. Smith, Niles, Mich., assignor to Michigan Wire Goods Company, Niles, Mich.

Application May 27, 1933. Serial No. 673,181

9 Claims. (Cl. 53—5)

The main object of this invention is to provide a roaster or broiler for Frankfurters and the like which is adapted to effectively hold a plurality of articles to be roasted or broiled in spaced relation so that their surfaces may be effectively exposed to the heat.

A further object is to provide an implement of this character which is simple and economical in structure and easily manipulated, a plurality of articles such as Frankfurters being securely held.

Objects pertaining to details and economies of my invention will definitely appear from the description to follow. The invention is defined in the claims.

A structure embodying the features of my invention is clearly illustrated in the accompanying drawing, in which:

Fig. 1 is a perspective view of my improved roaster, the handles being partially broken away.

Fig. 2 is a plan view.

Fig. 3 is an enlarged end elevation.

Fig. 4 is an enlarged fragmentary view partially in section on line 4—4 of Fig. 1.

Fig. 5 is an enlarged fragmentary section on line 5—5 of Fig. 3.

Fig. 6 is an enlarged fragmentary section on line 6—6 of Fig. 2.

The embodiment of my invention illustrated in the accompanying drawing comprises a pair of holder members designated generally by the numerals 1 and 2, each holder member being provided with a handle 3. Each holder member comprises a plurality of longitudinal bars 4 and 5 and end cross pieces 6 and 7, these being formed integrally with the outer longitudinal bars 4. The central longitudinal bars 5 are welded to the end cross pieces as indicated at 8 in Figs. 5 and 6.

The central or intermediate bars of one holder terminate in pivot arms 9 having eyes 10 at their ends pivotally engaging the outer end cross member 6 of the other holder member. These longitudinal bars are corrugated, the corrugations of the two holder members being arranged in opposed relation to provide pockets for Frankfurters or the like indicated at 11. These parts are formed of wire.

The handles 12 are each formed of a piece of wire folded upon itself. The loop portion 13 at the outer end thereof constitutes a grip and the arms are brought together to provide relatively long shanks terminating in diverging arms 14 which are lapped upon and spot welded to the inner cross pieces and the inner ends of the outer longitudinal bars. The handle thus constitutes bracing and reinforcing means and the arrangement also provides a balanced structure. The handles may be swung apart to permit the arrangement of Frankfurters or other articles to be cooked in the pockets formed by the opposed corrugations, and when the handles are swung together the Frankfurters are securely clamped and held in spaced relation as shown in Fig. 1 as the user grasps the end or grip portions of both handles.

The implement is desirable for use in toasting bread, broiling steak, or the like, but is especially designed and desirable for roasting Frankfurters and the like.

Having thus described my invention what I claim as new and desire to secure by Letters Patent is:

1. The combination in a roaster, of a pair of coacting holder members each comprising a plurality of spaced longitudinal bars and end cross pieces fixedly secured thereto, a pair of longitudinal bars of one holder member having at their outer ends laterally offset arms terminating in eyes pivotally receiving the outer end cross piece of the other holder member, and handles having shanks terminating in diverging arms lapped upon and fixedly secured to said holder members, the longitudinal bars of said holder members being longitudinally corrugated with their corrugations disposed oppositely and coacting to provide a plurality of spaced holder pockets.

2. The combination in a roaster, of a pair of coacting holder members each comprising a plurality of spaced longitudinal bars and end cross pieces fixedly secured thereto, a pair of longitudinal bars of one holder member having at their outer ends laterally offset arms terminating in eyes pivotally receiving the outer end cross piece of the other holder member, and handles for said holder members, the longitudinal bars of said holder members being longitudinally corrugated with their corrugations disposed oppositely and coacting to provide a plurality of spaced holder pockets.

3. The combination in a roaster, of a pair of coacting holder members each comprising a plurality of spaced longitudinal bars and end cross pieces fixedly secured thereto, a pivotal connection for the outer ends of said holder members, and handles having shanks terminating in diverging arms lapped upon and fixedly secured to said holder members, the longitudinal bars of said holder members being longitudinally corrugated with their corrugations disposed oppositely and coacting to provide a plurality of spaced holder pockets.

4. The combination in a roaster, of a pair of coacting holder members each comprising a plurality of spaced longitudinal bars and end cross pieces fixedly secured thereto, a pivotal connection for the outer ends of said holder members, and handles for said holder members, the longitudinal bars of said holder members being longitudinal corrugated with their corrugations disposed oppositely and coacting to provide a plurality of spaced holder pockets.

5. The combination in a roaster, of a pair of coacting holder members pivotally connected at their outer ends and each comprising a plurality of spaced corrugated bars, the corrugations of the two holder members being opposed and transversely alined and coacting to provide article receiving pockets, and handles secured to the inner ends of said holder members whereby they may be manipulated and having grip portions adapted to be simultaneously grasped for holding the holder members in closed or article gripping position.

6. The combination in a roaster, of a pair of coacting holder members pivotally connected at their outer ends and each comprising a plurality of spaced corrugated bars, the corrugations of the two holder members being opposed and transversely alined and coacting to provide article receiving pockets, and handles for said holder members.

7. The combination in a roaster or the like, of a pair of coacting holder members, each comprising a plurality of spaced longitudinal bars and end cross pieces, the outer longitudinal bars and end cross pieces being formed integrally of wire, the intermediate longitudinal bars being lapped upon and spotwelded to the end cross pieces, a pair of the intermediate longitudinal bars of one holder having longitudinally offset arms at their outer ends terminating in eyes pivotally receiving the outer end cross piece of the other holder member, the longitudinal bars of said holder members being corrugated and their corrugations disposed oppositely to provide spaced holder pockets, and handles formed of pieces of wire folded upon themselves, the loop ends thereof constituting grips, the arms constituting shanks and terminating in diverging arms lapped upon the inner cross pieces and the outer longitudinal bars and spotwelded thereto.

8. The combination in a roaster or the like, of a pair of coacting holder members, each comprising a plurality of spaced longitudinal bars and end cross pieces, the outer longitudinal bars and end cross pieces being formed integrally of wire, the intermediate longitudinal bars being lapped upon and spotwelded to the end cross pieces, a pair of the intermediate longitudinal bars of one holder having longitudinally offset arms at their outer ends terminating in eyes pivotally receiving the outer end cross piece of the other holder member, the longitudinal bars of said holder members being corrugated and their corrugations disposed oppositely to provide spaced holder pockets, and handles on the holder members.

9. The combination of a pair of coacting holder members, each comprising outer longitudinal bars and end cross pieces formed integrally of wire, and handles formed of pieces of wire folded upon themselves, the loop ends thereof constituting grips, the arms constituting shanks and terminating in diverging arms lapped upon the inner cross pieces and the outer longitudinal bars and spot welded thereto.

BENJAMIN H. SMITH.